United States Patent

Jensvold et al.

[11] Patent Number: 6,153,097
[45] Date of Patent: Nov. 28, 2000

[54] INTERNAL STAGED PERMEATOR FOR FLUID SEPARATION

[75] Inventors: John Jensvold, Benicia, Calif.; Glenn Lipscomb, Perrysburg, Ohio

[73] Assignees: MG Generon, Malvern, Pa.; University of Toledo, Toledo, Ohio

[21] Appl. No.: 09/320,164

[22] Filed: May 26, 1999

[51] Int. Cl.[7] .................................................. B01D 63/04
[52] U.S. Cl. ............................. 210/321.81; 210/321.79; 210/321.8; 210/321.88; 210/321.89; 210/321.9; 210/500.23; 96/7; 96/8; 96/9; 96/10
[58] Field of Search .......................... 210/321.8, 321.81, 210/321.89, 321.79, 321.9, 321.88, 500.23; 96/7, 8, 9, 10

[56] References Cited

U.S. PATENT DOCUMENTS

| | | | |
|---|---|---|---|
| 4,964,886 | 10/1990 | Brugerolle et al. | 55/16 |
| 5,013,331 | 5/1991 | Edwards et al. | 55/16 |
| 5,043,067 | 8/1991 | Sorensen | 210/321.89 |
| 5,137,631 | 8/1992 | Eckman et al. | 210/321.89 |
| 5,176,725 | 1/1993 | Puri et al. | 210/321.81 |
| 5,288,308 | 2/1994 | Puri et al. | 210/321.81 |
| 5,470,469 | 11/1995 | Eckman | 210/321.8 |
| 5,525,143 | 6/1996 | Morgan et al. | 95/52 |
| 5,549,829 | 8/1996 | Le | 210/636 |
| 5,709,732 | 1/1998 | Prasad | 95/45 |

OTHER PUBLICATIONS

Kimura et al., "Separation of Rare Gases by Membranes," *Radiochem, Radioanal Lett.* 13:349–354 (1973).

*Primary Examiner*—John Kim
*Attorney, Agent, or Firm*—Robins & Associates

[57] ABSTRACT

A gas separation membrane device comprising an internally staged permeator containing a three dimensional array of hollow fiber membranes grouped into multiple sets in intimate contact with each other is described. The incorporation of the internally staged permeator, particularly, the arrangement of the multiple sets of fiber membranes in intimate contact with each other, results in improved efficiency of the device, especially for feed streams or membrane types that lead to high permeate flow rate that result in excessive shellside pressure drops.

25 Claims, 4 Drawing Sheets

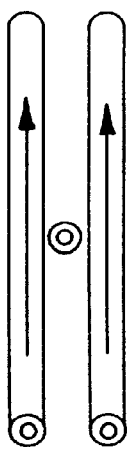
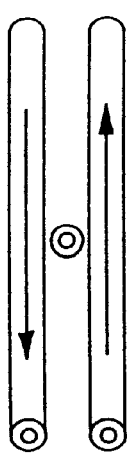
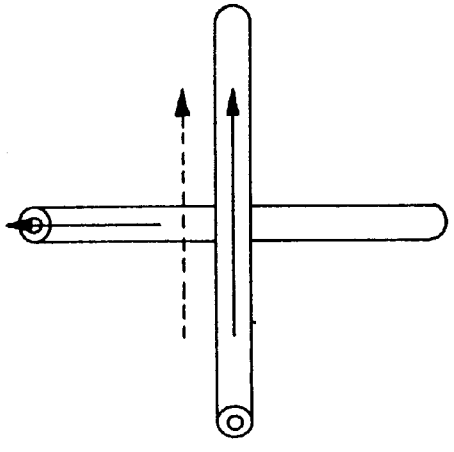
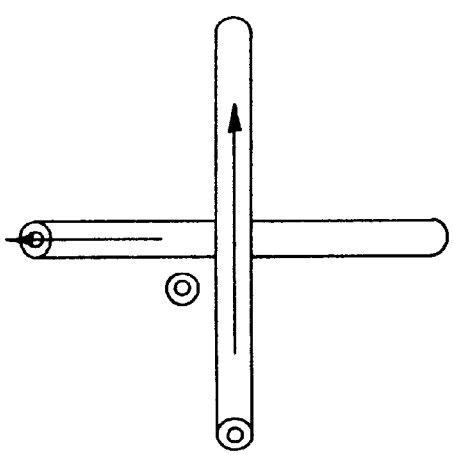
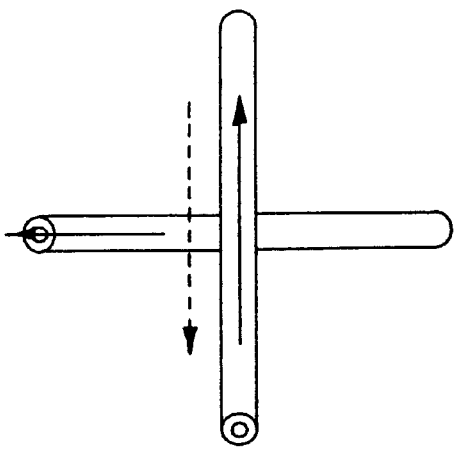

INTERNAL STAGED PERMEATOR FOR FLUID SEPARATION

TECHNICAL FIELD

The invention relates generally to fluid membrane separation using fiber membrane technology. In particular, the present invention relates to an internally staged permeator comprising a three dimensional array of hollow fiber membranes grouped into multiple sets in intimate contact with each other.

BACKGROUND OF THE INVENTION

A variety of devices for separating fluid mixtures with hollow fiber membranes have been described. Typically, the separation process is carried out in a module fabricated from semi-permeable membranes. Such selective permeation results in the separation of the fluid mixture into retentate, i.e. slowly permeable components, and permeate portions, i.e. faster migrating components. The efficiency of the fluid separation process is determined by the properties of fluid mixture, relative permeabilities of various components of the fluid mixture, resulting from a gradient of driving forces, such as pressure, partial pressure, concentration and temperature, the membrane material and its structure. Preferably, the separation membrane is highly selective, i.e. the membrane has a high separation factor, high gas permeability, and is resistant to chemicals and temperature variations, and is mechanically strong. However, membranes with high selectivity are generally characterized by low permeability, while membranes with high permeability generally possess unacceptably low separation factors.

Attempts have been made to improve efficiency of the fluid separation process by developing new materials with better membrane transport properties, or by modifying the module design of the separation device. Generally, module designs consist of heat exchanger designs for controlling the contacting of internal flows. Conventional designs generally rely on co-current flow, counter-current flow, and cross flow contacting patterns for the low-pressure permeate and high-pressure retentate. See for e.g. U.S. Pat. Nos. 5,288,308; 5,176,725; 5,525,143; 5,013,331; 5,709,732; 4,964,886; 5,470,469; 5,137,631; 5,043,067 and 5,549,829.

The performance of these basic designs is improved by (1) permeate recycling, i.e. introducing a portion of one of the product streams back into the same module, or (2) module cascades, including the continuous membrane column, wherein a portion of one of the product streams back into a second module. Internal baffles or other design features permit cascading within a single fiber bundle. The internal staging design described by Kimura et al. (S. Kimura, et al., *Radiochem. Radioanal. Lett.*, 1973, 13:349–354) consists of membranes made from two different materials, permitting contacting the feed with both membranes simultaneously, wherein each membrane possesses different permselectivity. Thus this design has limited utility, because materials with the requisite transport properties are available only for a limited number of separations. Additionally, although in comparison to external staging, internally staged designs require less plumbing and fewer module housings, the cost of manufacture is higher due to increased complexity.

Therefore, current membrane devices containing membrane modifications, and internally staged designs have several disadvantages and thus are not commercially viable for meeting current uses. Thus, there is a need for improved and cost-effective devices comprising fiber membranes that are capable of operating at acceptable levels of separation productivity.

The current method provides a cost-effective gas separation membrane device with a significant improvement in selectivity with a commercially acceptable loss of productivity.

SUMMARY OF THE INVENTION

The present invention defines a novel internally staged permeator (ISP) gas separation membrane device containing primarily hollow fiber membranes. The ISP system produces two permeate streams, a low-pressure and an intermediate-pressure permeate, and a high pressure retentate stream. The device comprises a plurality of sets of hollow fiber membranes to enable contacting patterns for three internal flow streams. The incorporation of ISP with multiple streams, results in improved efficiency of the device. The multiple streams permit maximum contact with the hollow fiber membranes, thus resulting in improved yields.

In one aspect, the invention relates to a hollow fiber membrane fluid separation device comprising:

(a) a first set of a plurality of elongate hollow fiber membranes adapted for separation of one or more fluids from a fluid mixture, wherein said membranes are arranged in a first set of hollow fiber membranes having a first end and a second end, and further wherein said first set of hollow fiber membranes is adapted for boreside feed;

(b) a first tubesheet having an inner face and an outer face and arranged at the first end of the first set of hollow fiber membranes, wherein said first set of hollow fiber membranes extend through said first tubesheet and are open at the outer face thereof;

(c) a second tubesheet having an inner face and an outer face and arranged at the second end of the first set of hollow fiber membranes, wherein said first set of hollow fiber membranes extend through said second tubesheet and are open at the outer face thereof;

(d) a second set of a plurality of elongate hollow fiber membranes adapted for separation of one or more fluids from a fluid mixture, wherein said membranes are arranged in a second set of hollow fiber membranes having a first end and a second end, and further wherein said second set of hollow fiber membranes is adapted for shellside feed;

(e) a third tubesheet having an inner face and an outer face and arranged at the first end of the second set of hollow fiber membranes, wherein said second set of hollow fiber membranes extend through said third tubesheet and are open at the outer face thereof;

(f) a fourth tubesheet having an inner face and an outer face and arranged at the second end of the second set of hollow fiber membranes, wherein said second set of hollow fiber membranes extend through said fourth tubesheet and are open at the outer face thereof;

(g) a shell having first, second, third and fourth open ends, wherein the first set of hollow fiber membranes, the first and second tubesheets, and the second set of hollow fiber membranes, the third and fourth tubesheets are encased within said shell, and the first set of hollow fiber membranes and the second set of hollow fiber membranes are arranged in spaced-apart relation to each other within the shell;

(h) a first sealing endcap which is attached to the first open end of the shell, wherein a first feed inlet region is established between said first endcap and the outer face of the first tubesheet;

(i) a first feed inlet for introducing into the first feed inlet region a fluid mixture to be separated into the bores of the first set of hollow fiber membranes;

(j) a second sealing endcap which is attached to the second open end of the shell, wherein a first non-permeate outlet region is established between said second endcap and the outer face of the second tubesheet;

(k) a first retentate outlet for removing from the first non-permeate outlet region fluid from the mixture which does not permeate from the first set of hollow fiber membranes;

(l) a third sealing endcap which is attached to the third open end of the shell, wherein a second permeate outlet region is established between said third endcap and the outer face of the third tubesheet;

(m) a second permeate outlet for removing from the second permeate outlet region fluid from the mixture which permeates from the boreside of the second set of hollow fiber membranes;

(n) a fourth sealing endcap which is attached to the fourth open end of the shell, wherein a third permeate outlet region is established between said fourth endcap and the outer face of the fourth tubesheet;

(o) a third permeate outlet for removing from the third permeate outlet region fluid from the mixture which permeates from the boreside of the second set of hollow fiber membranes;

(p) first and second sealing mechanism which respectively seal the first and second tubesheets against the shell, thereby defining a first permeate outlet region between said shell and the outside of said first set of hollow fiber membranes, wherein said region comprises a second feed inlet region for introducing fluid from the mixture which permeates from the first set of hollow fiber membranes into the shellside of said second set of hollow fiber membranes; and (q) a fourth permeate outlet for removing from the first permeate outlet region fluid from the mixture which permeates from the shellside of the first set of hollow fiber membranes.

In an alternative embodiment, the device as described above, further comprises a first set of a plurality of elongate permeate flow channels arranged in spaced-apart relation to each other within the first set of hollow fiber membranes and extending from the first end to the second end of the first set of hollow fiber membranes, wherein the first set of permeate flow channels are embedded in the first and second tubesheets. In preferred embodiments, the first set of permeate flow channels further extend through the first and second tubesheets, and are sealed at the outer faces of the first and second tubesheets, respectively.

In another alternative embodiment, the device as described above, further comprises a second set of a plurality of elongate permeate flow channels arranged in spaced-apart relation to each other within the second set of hollow fiber membranes and extending from the first end to the second end of the second set of hollow fiber membranes, wherein the second set of permeate flow channels are embedded in the third and fourth tubesheets. In preferred embodiments, the second set of permeate flow channels further extend through the third and fourth tubesheets, and are sealed at the outer faces of the third and fourth tubesheets.

In preferred embodiments, the first and second sets of permeate flow channels are arranged uniformly within the first and second set of hollow fiber membranes respectively such that efficient flow performance can be maintained during fluid separations.

In an additional embodiment, the inlets and the outlets of the device as described above further comprise a regulator. In an alternative embodiment, the device as described above further comprises baffles.

In preferred embodiments, each of the first and second sets of hollow fiber membranes comprises the membranes arranged in a bundle, as sheets or as cartridges, respectively. In additional embodiments, the first and second sets of hollow fiber membranes are arranged at an angle of about 0 degrees to about 180 degrees from each other, preferably at an angle of about 90 degrees from each other.

In another preferred embodiment, the first set of hollow fiber membranes is encased within the second set of hollow fiber membranes. In an alternative embodiment, the second set of hollow fiber membranes is encased within the first set of hollow fiber membranes. In more preferred embodiments, the first and second set of hollow fiber membranes comprises a series of concentric layers of hollow fiber membranes arranged in a first and a second bundle, respectively, further comprising the first and second set of permeate flow channels arranged at the interfaces between adjacent concentric membrane layers within each the first and second bundle, respectively.

In a preferred embodiment, the fluid mixture comprises a mixture of gases. Preferably the gas mixture comprises a gas selected from the group consisting of hydrogen, oxygen, helium, nitrogen, methane, carbon monoxide, and carbon dioxide.

The invention device yields a high-purity non-permeate product stream, while improving productivity and recovery of the process. Additionally, the invention is cost-effective, easy to manufacture and can be easily adapted for a wide range of productivity requirements.

These and other embodiments of the present invention will readily occur to those of ordinary skill in the art in view of the disclosure herein.

BRIEF DESCRIPTION OF THE DRAWINGS

FIG. 4 illustrates the flow patterns for contacting the sets of hollow fiber membranes.

DETAILED DESCRIPTION

Figure 1:
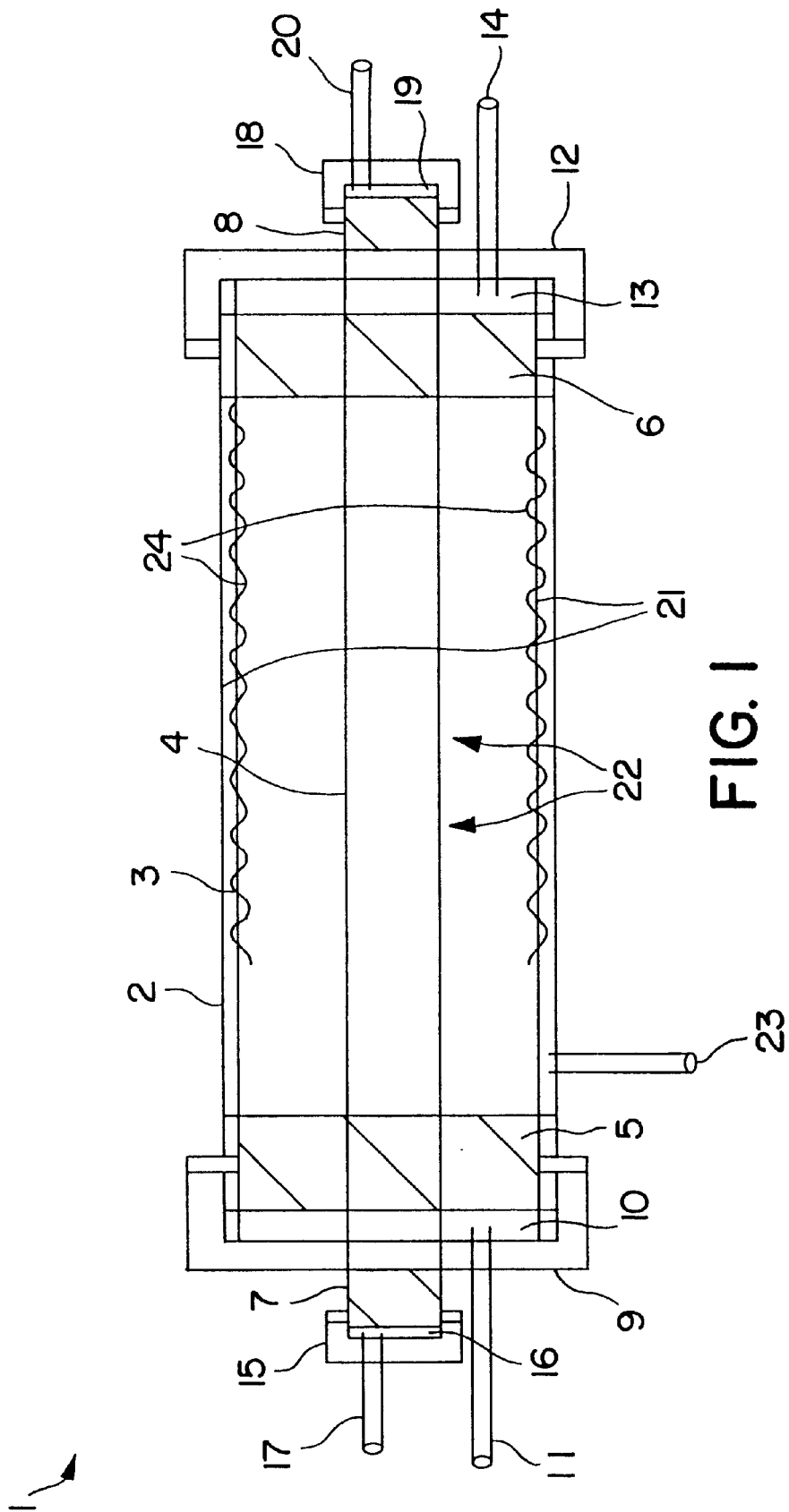
FIG. 1 illustrates a sectional view of the membrane separation device according to one embodiment of the invention.

The practice of the present invention will employ, unless otherwise indicated, conventional techniques of chemistry and engineering which are within the skill of the art. Such techniques are explained fully in the literature. Kesting, R. E., *Synthetic Polymeric Membranes*, John Wiley & Sons, $2^{nd}$ Ed. (1985); Hwang, Sun-Tak and Kammermeyer, Karl, *Membranes in Separation*, Robert E. Kriegar Publishing Co., Inc., (1984).

All patents, patent applications, and publications mentioned herein, whether supra or infra, are hereby incorporated by reference in their entirety.

It must be noted that, as used in this specification and the appended claims, the singular forms "a", "an", and "the"

include plural referents unless the content clearly dictates otherwise. Thus, for example, reference to "a hollow fiber membrane" includes two or more such membranes and the like.

Although a number of compositions and methods similar or equivalent to those described herein can be used in the practice of the present invention, the preferred materials and methods are described. Therefore, it is to be understood that the terminology and examples used herein are for the purpose of describing particular embodiments of the invention only, and are not intended to be limiting.

The present invention provides a device comprising membrane modules for separating one or more fluids in a fluid mixture into permeate and retentate portions. The fluid mixture may be a mixture of fluids in a gas, vapor, or liquid state. The membrane module comprises a hollow casing and a plurality of flexible hollow fibers of semi-permeable membrane material. The flexible hollow fiber membranes are capable of separating a fluid mixture into permeate and retentate portions. Each hollow fiber membrane has a pair of spaced opposite end portions and an elongated portion extended between and interconnecting opposite end portions. The casing encloses a novel internally staged permeator (ISP) design for membrane-based gas separation modules, as described below. The ISP design produces three streams: (1) a low-pressure permeate stream; (2) an intermediate-pressure permeate stream; and (3) a high-pressure retentate stream. Generally, the low-pressure permeate and high-pressure retentate contact the hollow fiber membranes in one of the following contacting patterns: (a) in co-current flow, wherein the permeate and retentate streams flow parallel to one another; (b) in counter-current flow, wherein the permeate and retentate streams flow in opposite directions; and (c) in cross-flow, wherein the permeate and retentate flow in mutually perpendicular directions. The preferred embodiments comprise a device wherein the intermediate-pressure permeate and retentate streams contact the fibers co-currently and further contact the low-pressure and intermediate-pressure permeate streams in cross-flow. The more preferred embodiments comprise a device wherein the intermediate-pressure permeate and retentate streams contact the fibers co-currently and contact the low-pressure and intermediate-pressure streams counter-currently.

The present invention provides a hollow fiber membrane fluid separation device comprising multiple sets of a plurality of elongate hollow fiber membranes adapted for separation of one or more fluids from a fluid mixture. The membranes are arranged in a first set of hollow fiber membranes having a first end and a second end, wherein the first set of hollow fiber membranes is adapted for boreside feed. The membranes are arranged in a second set of hollow fiber membranes having a first end and a second end, wherein the second set of hollow fiber membranes is adapted for shellside feed. The hollow fiber membranes in each of the first and second set may be formed from the same or different polymeric material, described in greater detail infra. Although preferred embodiments of the invention device comprising two sets of hollow fiber membranes is described, the invention device also includes embodiments comprising multiple sets of hollow fiber membranes, wherein each set is alternately adapted for boreside feed and shellside feed. For example, in an embodiment wherein the invention device comprises four sets of hollow fiber membranes, and further wherein each set of the hollow fiber membrane is arranged as a sheet, the first and third sheets are adapted for boreside feed while the second and fourth sheets are adapted for shellside feed. Similarly, in an embodiment wherein the invention device comprises six sets of hollow fiber membranes, and further wherein each set of the hollow fiber membrane is arranged as a sheet, the first, third and fifth sheets are adapted for boreside feed while the second, fourth and sixth sheets are adapted for shellside feed, and so on.

Figure 2:
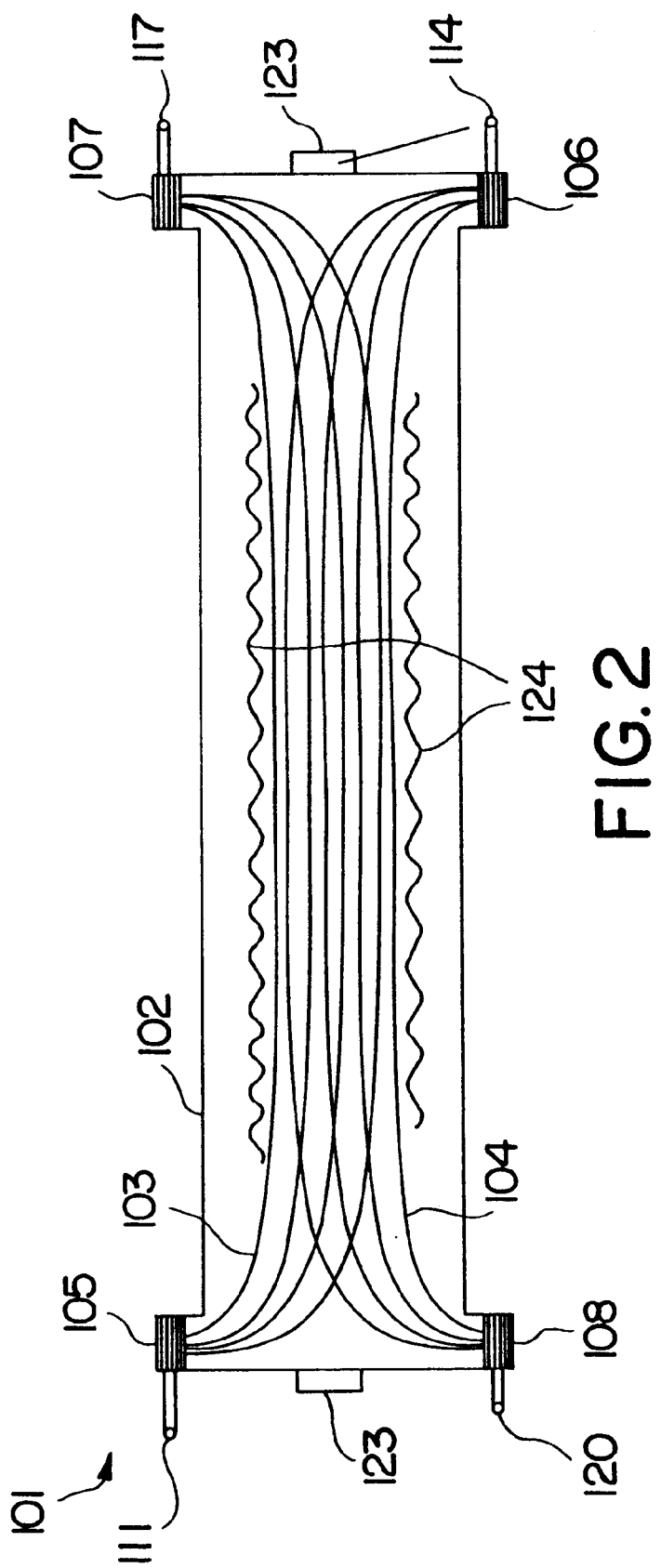
FIG. 2 illustrates a sectional view of the membrane separation device according to another embodiment of the invention.

The hollow fiber membranes can be arranged in various forms such as individual hollow fiber membranes, a plurality of hollow fiber membranes intermingled with each other, bundles, cartridges or sheets of hollow fiber membranes, knitted or wefted textiles, and membrane carpets or rugs, including those disclosed in Mahon, U.S. Pat. No. 3,228,876 and McLain, U.S. Pat. No. 3,422,008. In preferred embodiments, each of the first and second sets of hollow fiber membranes comprise the membranes intermingled with each other, for example, as illustrated in FIG. 2, or arranged in a bundle, as sheets or as cartridges, respectively. In additional embodiments, the first and second sets of hollow fiber membranes are arranged at an angle of about 0 degrees to about 180 degrees from each other, preferably at an angle of about 90 degrees from each other. Preferably the first and second set of hollow fiber membranes are spaced at a distance of about 1 mm to about 1 m from each other, more preferably about 1 mm to about 100 cm, and even more preferably about 1 mm to about 10 cm.

In preferred embodiments, each of the first and second sets of hollow fiber membranes comprise the membranes arranged in a bundle or a cartridge, more preferably in a bundle. In a preferred embodiment, multiple cartridges of hollow fiber membranes are arranged encased within a shell, wherein the cartridges are alternately adapted for boreside and shellside feed. In another preferred embodiment the first set of hollow fiber membranes (first bundle) is encased within the second set of hollow fiber membranes (second bundle). In an alternative embodiment, the second bundle of hollow fiber membranes is encased within the first bundle of hollow fiber membranes. In more preferred embodiments, the first and second set of hollow fiber membranes comprise series of concentric layers of hollow fiber membranes arranged in a first and a second bundle, respectively, further comprising the first and second set of permeate flow channels arranged at the interfaces between adjacent concentric membrane layers within each the first and second bundle, respectively. Preferably the bundle is arranged in a substantially non-random organized manner. In a preferred embodiment, the bundle is elongated and arranged in a cylindrical fashion with the ends of the hollow fiber membranes located at each end of the cylindrical bundle. Preferably, the hollow fiber membranes in the bundle are arranged in either a parallel wrap fashion, wherein the hollow fiber membranes lie substantially parallel to one another with each end of the hollow fiber membranes found at each end of the bundle. In an alternative embodiment, the hollow fiber membranes in the bundle are wrapped in a bias wrap fashion, wherein the hollow fiber membranes are wrapped in a crisscross pattern at a set angle, thus holding the hollow fiber membranes in place in a bundle. In another embodiment, the first set of hollow fiber membranes, arranged as a bundle, is placed lengthwise in a module and the second set of hollow fiber membranes is wrapped radially around the first set of hollow fiber membranes. In a preferred embodiment, the first bundle serves as a core and the second set of hollow fiber membranes is wrapped radially at an angle of about 0 degrees to about 180 degrees, preferably at an angle of about 90 degrees, around the first bundle.

In other preferred embodiments, each of the first and second sets of hollow fiber membranes comprises the membranes arranged in sheets. As used herein, a sheet comprises one or more mats of hollow fiber membranes, wherein each mat comprises a plurality of hollow fiber membranes arranged in parallel, and further wherein each mat is the thickness of one hollow fiber membrane. In a preferred embodiment, the first set and second of hollow fiber membranes, i.e. first and second sheet respectively, are arranged at an angle of about 0 degrees to about 180 degrees from each other, preferably at an angle of about 90 degrees from each other. In more preferred embodiments, the first and second set of hollow fiber membranes further comprise a first and second set of permeate flow channels arranged within each the first and second sheets respectively. Preferably the sheet is arranged in a substantially non-random organized manner. The sheet may be in any appropriate geometric shape, such as circular, square, rectangular, and the like. Preferably the sheet is square or rectangular and arranged in a manner such that the ends of the hollow fiber membranes located at either end of the sheet. Preferably, the hollow fiber membranes in the sheet are arranged in either a parallel wrap fashion, wherein the hollow fiber membranes lie substantially parallel to one another with each end of the hollow fiber membranes found at either end of the sheet. In an alternative embodiment, the hollow fiber membranes in the sheet are wrapped in a bias wrap fashion, wherein the hollow fiber membranes are wrapped in a crisscross pattern at a set angle, thus holding the hollow fiber membranes in place in a sheet.

In a preferred embodiment, the number of fibers in a set range from 0.01 to 5 million, preferably from 0.1–2 million and most preferably from 0.1 to 1.5 million; wherein the outer diameter of the fiber ranges from 100 to 500 microns, preferably from 100 to 300 microns, and most preferably from 100 to 200 microns; and the ratio of the hollow fiber membrane count in the first set of hollow fiber membranes to the hollow fiber membrane count in the second set of hollow fiber membranes is about 5:1 to about 1:5, preferably about 3:1 to about 1:3, and more preferably about 1.5:1 to about 1:1.5. The packing density of the fibers within the bundle ranges from 30 to 70%, preferably from 40 to 65% and most preferably from 50 to 60%; wherein the packing density is defined as the fraction of the cross-sectional area of the module occupied by the hollow fiber membranes, wherein the cross-sectional area is based on its internal diameter and the cross-sectional area of the hollow fiber membranes is based on their outer diameter. In the embodiments wherein each set of hollow fiber membranes is arranged in a bundle, the outer diameter of the bundle arranged as concentric circles ranges from 1 to 15 inches, preferably from 1 to 12 inches, and most preferably from 2 to 10 inches. In the embodiment wherein each set of hollow fiber membranes is arranged as sheets, the dimensions of the sheets ranges from 2×2 to 84×84 square inches, preferably from 10×10 to 84×84 square inches, and most preferably from 15×10 to 84×84 square inches.

The hollow fiber membranes are generally formed from a semi-permeable polymeric material, preferably olefinic polymers, such as poly-4-methylpentene, polyethylene, and polypropylene; polytetrafluoroethylene; cellulosic esters; cellulose ethers; and regenerated cellulose; polyamides; polyetherketones and polyetheretherketones; polyestercarbonates; polycarbonates, including ring substituted versions of bisphenol based polycarbonates; polystyrenes; polysulfones; polyimides; polyethersulfone; and the like. Membranes of the invention may be homogenous, composite, symmetric, or asymmetric membranes, as described in U.S. Pat. No. 4,874,401. Preferably the membranes of the invention are asymmetric or composite. In addition, the membranes may be shaped in the form of flat sheets, hollow fibers, or hollow tubes. The membranes may have a dense discriminating region wherein the separation of the fluid mixture is based on differences in solubility and diffusivity of the fluids; or the membranes may be microporous wherein the separation is based on relative volatilities of the fluids. Preferably the membranes are asymmetric fibers as described in U.S. Pat. No. 4,955,993. The methods for preparing such hollow fiber membranes are well known in the art. (See, for example, U.S. Pat. No. 4,961,760).

A tubesheet is arranged around each end of the set of hollow fiber membranes, such that the hollow fiber membranes extend through the tubesheet and are open at the outer surface thereof. The tubesheet provides a support, holding the hollow fiber membranes in place and separates the membrane device into three different regions: (1) the feed inlet for the introduction of fluid mixture to be separated into the hollow fiber membranes; (2) the region between the tubesheets wherein a portion of the boreside fed fluid permeates across the hollow fiber membranes onto the shellside of the hollow fiber membranes; and (3) the non-permeate outlet region from which the retentate fluid is removed. The tubesheet is comprised of a thermoset or thermoplastic resinous material capable of forming a fluid-tight seal around the hollow fiber membranes, and optionally capable of bonding to the core and/or the hollow fiber membranes. The face of each tubesheet opposite the first set of hollow fiber membranes is opened such that the bores of the hollow fiber membranes are opened to the region adjacent to each face, thereby allowing communication of fluid from such regions into and out of said hollow fiber membranes. The face of each tubesheet opposite the second set of hollow fiber membranes is sealed such that the bores of the hollow fiber membranes are sealed to the region adjacent to each face, thereby allowing shellside feed to the second set of hollow fiber membranes. Each tubesheet generally comprises a composite of the hollow fiber membranes embedded in the resinous material. The tubesheet may exist in any shape as desired, as long as it is able to withstand the pressure during operation. In embodiments wherein the hollow fiber membranes are arranged as a bundle or a cartridge, the tubesheet is circular with sufficient cross-sectional area and thickness to provide adequate support for the hollow fiber membranes. In embodiments wherein the hollow fiber membranes are arranged as a sheet, the tubesheet is linear with sufficient cross-sectional area and thickness to provide adequate support for the hollow fiber membranes. The portion of each tubesheet outside of the bundle may be built up for various purposes depending upon the design of the device.

Examples of resinous materials for the tubesheet are described in U.S. Pat. No. 4,961,760, and include artificial and natural rubbers, phenol aldehydes, acrylic resins, polysiloxanes, polyurethanes, fluorocarbons, and epoxy resins. In a preferred embodiment the tubesheet is prepared from epoxy resins. The device may optionally contain an additional tubesheet support mechanism to support the outer edge of the tubesheets and to prevent or reduce bending and compression stresses resulting from the application of pressure on the outside of the tubesheet. The tubesheet support mechanism may be made of any material which provides sufficient support to prevent or reduce the compression and bending stresses on the tubesheet and to prevent the tubesheets from collapsing in on one another. Such materials include high strength plastics such as PVC, composites, and metals such as aluminum and steel.

In an alternative embodiment, the membrane device further comprises a first set of a plurality of elongate permeate flow channels arranged in spaced-apart relation to each other within the first set of hollow fiber membranes and extending from the first end to the second end of the first set of hollow fiber membranes, wherein the first set of permeate flow channels are embedded in the first and second tubesheets. In preferred embodiments, the first set of permeate flow channels further extend through the first and second tubesheets, and are sealed at the outer faces of the first and second tubesheets.

In an alternative embodiment, the device further comprises a second set of a plurality of elongate permeate flow channels arranged in spaced-apart relation to each other within the second set of hollow fiber membranes and extending from the first end to the second end of the second set of hollow fiber membranes, wherein the second set of permeate flow channels are embedded in the third and fourth tubesheets. In preferred embodiments, the second set of permeate flow channels further extend through the third and fourth tubesheets, and are sealed at the outer faces of the third and fourth tubesheets.

The permeate flow channels are arranged in any desirable order and may be embedded within the interior of the set of hollow fiber membranes. Preferably, the first and second sets of permeate flow channels are arranged uniformly within the first and second set of hollow fiber membranes, respectively, such that efficient flow performance can be maintained during fluid separations. Preferably, the permeate flow channels are radially or helically distributed, wherein the permeate flow channel is at least about 3 to about 115 times the diameter of the membrane fiber, preferably at least about 7 to about 80 times, and more preferably at least about 19 to about 60 times the diameter of the membrane fiber. In a preferred embodiment, the set of hollow fiber membranes comprises a bundle wherein the hollow fiber membranes are arranged in a series of concentric layers, and the permeate flow channels are arranged at the interfaces between adjacent concentric membrane layers, such that the permeate flow channels are arranged in the bundle as a series of concentric rings which encircle the core.

The permeate flow channels have an outer diameter ranging from about 500 to 15000 microns; preferably 1000 to 10000 microns; and most preferably 2500 to 7500 microns. The number of permeate flow channels present in the bundle depends on the number required to lower the back pressure sufficiently (0.3 to 5 psig), while maintaining volumetric productivity. Generally, the number of permeate flow channels in a set of hollow fiber membranes is about one channel per 500 to 500,000 hollow fiber membranes; preferably one channel per 5,000 to 300,000 hollow fiber membranes; and most preferably one channel per 10,000 to 200,000 hollow fiber membranes. Additionally, to maintain efficient counter-current flow performance, it is desirable to place the permeate flow channels uniformly in the hollow fiber membrane bundle. The number of flow channels used, channel spacing and channel size thus depends upon the dimensions of the sheet, bundle or cartridge diameter, fiber packing density, and fiber permeability. In general, for high volumetric permeate flow, tight channel spacing and large channel size is necessary. In a preferred embodiment, wherein the set of hollow fiber membranes is arranged in a bundle, the permeate flow channels are preferably placed at intervals measured along the bundle diameter from the core of between about ¼ to about 2 inches, more preferably about ¾ to about 1½ inches, even more preferably about ¾ to 1¼. For example, in an embodiment wherein the membrane device contains a bundle 9" in diameter and 72" in length, as the bundle is fabricated from a belt of gas-separation membrane fiber, ¼" tubular polyethylene tubing is placed in the bundle at various intervals: at 2" diameter (3¼"×72" tubes placed 2" apart), at 4" diameter (6¼"×72" tubes placed 2" apart), at 6" diameter (9¼"×72" tubes placed 2" apart), and at 8" diameter (12¼"×72" tubes placed 2" apart).

The length of the permeate flow channels should be sufficient to promote appropriate/desirable flow along a major portion of the length of the hollow fiber membranes. The permeate flow channels preferably extend along the length of the bundle between the tubesheets between about 0 to 100%, more preferably between about 50 to 100%, even more preferably between about 80 to 100%. Other examples of materials useful as permeate flow channels include materials that have mechanical strength and high void fraction such as open cellofoam, helically wound polyethylene fiber, large-bore porous hollow fibers, elastic sleeving, metallic screen rolled in tubular or triangular form, and the like.

In another embodiment, a sweep fluid is introduced into the permeate outlet region to facilitate the removal of permeated fluids from the shellside of the hollow fiber membranes. The sweep fluid may be introduced through a sweep inlet. Alternatively, the sweep fluid may be introduced through a sweep inlet, a second port located at the opposite end of the module from the feed port, and in communication with the permeate outlet region. In one such embodiment, the sweep fluid is introduced at the opposite end of the module from the fluid mixture feed inlet. In an alternative embodiment, the sweep fluid is introduced at the same end of the module as the fluid mixture feed inlet.

The entire membrane device is placed within a shell so as to form a seal between the tubesheets and the shell, thus preventing the fluid from communicating across or through the seal. The seal is formed by any capping mechanism which provides a fluid tight seal between each of the tubesheets and the shell, including an adhesive material, an endcap, a gasket, and the like. The shell may comprise any material capable of protecting the membrane device from the environment, and is preferably a pressure vessel. Preferably, the casing material is a plastic such as PVC, a composite, or a metal. More preferably, the casing material is metal, such as aluminum or steel. The shell may optionally contain a material to absorb shock and/or to insulate the membrane device, wherein such material includes polyurethane foam and tightly packed foam beads.

Capping mechanisms are located at each end of the shell, and are arranged for sealing the end of the shell near the tubesheet to form regions adjacent to the opposite faces of the tubesheets which are opened to the hollow fiber membranes, i.e. (1) the first feed inlet region is between the first endcap and the outer face of the first tubesheet; (2) the first non-permeate outlet region between the second endcap and the outer face of the second tubesheet; (3) the second permeate outlet region between the third endcap and the outer face of the third tubesheet; and (4) the third permeate outlet region between said fourth endcap and the outer face of the fourth tubesheet. Further, the first and second sealing mechanism, respectively, seal the first and second tubesheets against the shell, thereby defining (1) a first permeate outlet region, and (2) a second feed inlet region, between the shell and the outside of the first set of hollow fiber membranes. Such end capping mechanisms are attached, i.e. optionally sealed or removably attached, to the shell by appropriate attachment mechanism such as bolting, using o-rings and grooves, clam-shell retainer and other equivalent mechanism.

The membrane device comprises a feed inlet for introducing into the feed inlet region the fluid mixture to be separated, such as a port, nozzle, fitting, or other suitable opening. The first feed inlet may be located in the first end capping mechanism. The first feed inlet region is defined by the first tubesheet, the first end capping mechanism, and the shell. The feed inlet region communicates with one end of the hollow fiber membranes, thus allowing the feed fluid mixture to be separated to flow into and down the bores of the first set of hollow fiber membranes. Preferably, the feed inlet region is sealed to prevent fluid communication with the outside of the membrane device or with the region between the tubesheets which is outside the hollow fiber membranes. The second feed inlet region (also the first permeate outlet region) is defined by the region between the shell and the outside of the first set of hollow fiber membranes. The second feed inlet is used for introducing fluid from the mixture which permeates from the first set of hollow fiber membranes into the shellside of the second set of hollow fiber membranes.

The membrane device comprises a non-permeate outlet for removing the retentate from the non-permeate outlet region. The retentate fluid exits the bores of the first set of hollow fiber membranes at the end opposite the first feed inlet end, and preferably, the exiting fluid enters a non-permeate outlet region. The first non-permeate outlet may be located in the second end capping mechanism, and includes a port, nozzle, fitting, or other suitable opening. The non-permeate outlet region is a cavity defined by the second tubesheet, the shell, and the second end capping mechanism. Preferably the non-permeate outlet region is sealed such that fluid cannot communicate with the outside of the membrane device or with the region between the tubesheets which is outside the hollow fiber membranes.

The membrane device comprises a plurality of permeate outlets for removing the fluid which permeates through the hollow fiber membranes into the permeate outlet region. The permeate outlets include a port, nozzle, fitting, or other suitable opening. The membrane device comprises (1) a second permeate outlet for removing from the second permeate outlet region fluid from the mixture which permeates from the boreside of the second set of hollow fiber membranes; (2) a third permeate outlet for removing from the third permeate outlet region fluid from the mixture which permeates from the boreside of the second set of hollow fiber membranes; and (3) a fourth permeate outlet for removing from the first permeate outlet region (also the second feed inlet region) fluid from the mixture which permeates from the shellside of the first set of hollow fiber membranes. The second permeate outlet may be located in the third end capping mechanism. The second permeate outlet region is defined by the third tubesheet, the third end capping mechanism, and the shell. The third permeate outlet may be located in the fourth end capping mechanism. The third permeate outlet region is defined by the fourth tubesheet, the fourth end capping mechanism, and the shell. The fourth permeate outlet may be located on the shell. The first permeate outlet region is defined as the region between the shell and the outside of the first set of hollow fiber membranes. Preferably, the permeate outlet is located at an end near the feed inlet, which in conjunction with the appropriate baffles, as described below, results in counter-current flow of the feed fluid mixture as compared to the flow of the permeate fluid.

In an additional embodiment, the inlet and the outlet of device as described above further comprise a regulator, such as valves, including needle valves, ball valves; and the like.

In an alternative embodiment, the device as described above further comprises baffles. Baffles are impervious barriers inserted in the set of hollow fiber membranes to direct fluid flow patterns. Baffles may be inserted or wrapped around both sets of hollow fiber membranes (as illustrated in FIG. 2) or may be around only one set of hollow fiber membranes (as illustrated in FIG. 1). Preferably, the baffles do not extend the entire length of the hollow fiber membranes and may be inserted as multiple segments around one or more sets of hollow fiber membranes. Baffles may be positioned anywhere in the set of hollow fiber membranes to most efficiently direct the flow of the fluid to be separated from the first set permeate stage to the second set feed stage. For example, internal baffling of the fluid flow in the shellside of a set of hollow fiber membrane bundle, can direct the fluid flow pattern as co-, cross or counter-cross flow, as described in detail below, preferably, in a co-cross counter flow pattern or a combination thereof.

In a preferred embodiment, the membrane devices of this invention are useful in separating a mixture wherein the feed mixture comprises a gas mixture of one or more gases. The feed mixture preferably comprises at least one of the gases selected from the group consisting of hydrogen, helium, oxygen, nitrogen, carbon monoxide, carbon dioxide, methane, hydrogen sulfide, ammonia, methane, other light hydrocarbons, and the like. Light hydrocarbons as used herein refers to $C_{1-4}$ containing saturated and unsaturated hydrocarbons. Examples of such gases being separated are hydrogen and/or helium from light hydrocarbons, oxygen from nitrogen, nitrogen from methane, carbon monoxide and/or carbon dioxide from light hydrocarbons, and the like.

The invention device comprising the internally staged permeator (ISP) design comprises multiple sets of hollow fiber membranes, wherein each set is encased in separate tubesheets as illustrated in FIG. 1. This allows one to independently control the flow and pressure within each fiber group. In operation, the high pressure feed is introduced through the first inlet to first feed inlet region. This high pressure feed into the first set of fibers produces a permeate at an intermediate pressure. The retentate fluids from the first set of the hollow fiber membranes are removed from the first non-permeate outlet region via the first retentate outlet. The intermediate pressure permeate simultaneously contacts the second set of hollow fiber membranes through the second feed inlet region to produce a lower pressure permeate. The concentration of the faster permeating species in the low pressure permeate can be greatly enriched over that achievable in a conventional design. The fluids permeating from the boreside of the second set of hollow fiber membranes can be withdrawn from any one of the second or the third permeate outlet region via the second and third permeate outlet, respectively. The fluid permeating from the shellside of the first and second sets of hollow fiber membranes may be withdrawn from the first permeate outlet region via the fourth permeate outlet.

Thus the novel internally staged permeator (ISP) design of the invention device produces three streams: (1) a low-pressure permeate stream; (2) an intermediate-pressure permeate stream; and (3) a high-pressure retentate stream. Generally, the low-pressure permeate and high-pressure retentate contact the hollow fiber membranes in one of the following contacting patterns: (a) in co-current flow, wherein the permeate and retentate streams flow parallel to one another; (b) in counter-current flow, wherein the permeate and retentate streams flow in opposite directions; and (c) in cross-flow, wherein the permeate and retentate flow in mutually perpendicular directions, as illustrated in FIG. 4.

Particularly, the thick solid arrow indicates the retentate flow direction which is always left to right; the thick dashed arrow indicates the intermediate-pressure permeate flow direction; a circle with a black dot inside indicates the intermediate-pressure permeate flows out of the plane of the paper and; the thin solid arrow indicates the low-pressure permeate flow direction. As illustrated in FIG. 4, the different flow configurations for the ISP design of the invention device comprise (A) co-co, (B) cross-cross-co, (C) counter-counter, (D) co-counter, (E) cross-cross-counter, (F) counter-co, (G) co-cross, (H) cross-cross-cross and (I) counter-cross fluid flow streams. These flow configurations may be achieved by the introduction of baffles in the set of hollow fiber membranes in a module. The preferred embodiments comprise a device wherein the intermediate-pressure permeate and retentate streams contact the fibers co-currently and further contact the low-pressure and intermediate-pressure permeate streams in cross-flow. The more preferred embodiments comprise a device wherein the intermediate-pressure permeate and retentate streams contact the fibers co-currently and contact the low-pressure and intermediate-pressure streams counter-currently.

Preferably, the separation process is carried out at pressures and temperatures which do not adversely affect the membrane. ISP performance depends on the intermediate-pressure permeate to retentate pressure ratio, preferably the ratio is about 1 to 3; more preferably about 1 to 2.5; and even more preferably 1 to 2. Additionally, for a continuous operation system, the operating temperature is preferably from about 0–100° C., more preferably from about 0–50° C.

In another preferred embodiment, wherein the fluid mixture to be separated comprises liquids, the material is transported through or across the membrane as a gas or vapor. The permeate may be removed from the device either as a gas or vapor or it may be condensed and removed as a liquid. This process of separation is referred to as membrane stripping, membrane distillation, or pervaporation and is preferably used to separate volatile compounds from non-volatile compounds. In membrane stripping, a microporous membrane is used and the permeate is removed from the device as a gas or vapor; in membrane distillation, the permeate is condensed and removed from the device as a liquid; whereas in pervaporation, a non-microporous membrane is used and the permeate may be removed as a gas or vapor as a liquid after condensation. Examples of volatile compounds which may be removed from liquid mixtures include $C_{1-10}$ aliphatic and aromatic halogenated hydrocarbons such as dichloromethane, dibromomethane, chloroform, tribromomethane, carbon tetrachloride, 1,1-dichloroethane, 1,2-dichloroethane, 1,1,1-trichloroethane, 1,1,2-trichloroethane, trichloroethylene, tetrachloroethylene (perchloroethylene), 1,2-dichloropropane, chlorobenzene, dichlorobenzene, trichlorobenzene, and hexachlorobenzene; $C_{1-10}$ aliphatic and aromatic hydrocarbons such as methane, ethane, propane, butane, hexane, heptane, octane, ethylene, propylene, butylene, benzene, toluene, and xylene; $C_{1-10}$ aliphatic and aromatic alcohols such as methanol, ethanol, propanol, butanol, pentanol, hexanol, and phenol; $C_{1-8}$ ketones such as acetone, methylethyl ketone, methylisobutylketone, pentanone, and hexanone; $C_{1-8}$ ethers such as bis(2-chloroethyl)ether; $C_{1-8}$ amines such as methylamine, dimethylamine, trimethylamine, ethylamine, diethylamine, triethylamine, ethylenediamine, and aniline; and the like. Less volatile liquids from which the volatile compounds may be removed include water and mixtures of water and organics. In another preferred embodiment, gases may be purified from solutions or other liquid impurities. Examples of such gases include oxygen, carbon monoxide, carbon dioxide, methane, sulfur dioxide, hydrogen sulfide, ammonia, and the like.

The hollow fiber membrane device of the invention is constructed using processes well known in the art. Generally, the hollow fiber membranes are bundled into a desirable shape, preferably the bundles are arranged in a series of concentric layers or bias wrap laying down of fibers. The tubesheets are formed about the ends of the bundle either simultaneously with laying down of the fibers, or after the bundles are formed by techniques well known in the art. The permeate flow channels are arranged within the hollow fiber bundle during fabrication of the bundle, wherein the permeate flow channels are preferably arranged at the interface between the adjacent membrane layers.

The hollow fiber bundles with tubesheets are inserted into the shell, followed by attachment of endcaps at each end of the shell. The following descriptions of preferred embodiments as illustrated by the figures is provided to further illustrate the invention.

FIG. 1 illustrates one embodiment of the hollow fiber membrane device 1 of the invention wherein the entire device 1 is housed within a shell 2. The device 1 comprises a first set of hollow fiber membranes arranged in a first bundle 3, wherein the first bundle is adapted for boreside feed. The device further comprises a second set of hollow fiber membranes arranged in a second bundle 4, wherein the second bundle is adapted for shellside feed. The first tubesheet 5 and the second tubesheet 6 are arranged at the first and second end, respectively, of the first bundle of hollow fiber membranes 3. The third tubesheet 7 and the fourth tubesheet 8 are arranged at the first and second end, respectively, of the second bundle of hollow fiber membranes 4. In one embodiment, the hollow fiber bundle 3 is arranged around the hollow fiber bundle 4. Encircling the entire hollow fiber bundles 3 and 4 and tubesheets 5, 6, 7 and 8 is a shell 2. A first endcap 9 is attached to the first open end of the shell 2, wherein a first feed inlet region 10 is established between the first endcap 9 and the outer face of the first tubesheet 5. The first endcap 9 comprises a feed inlet 11, for introducing the fluid mixture to be separated into the first feed inlet region 10. A second endcap 12 is attached to the second open end of the shell, wherein a first non-permeate outlet region 13 is established between the second endcap 12 and the outer face of the second tubesheet 6. The second endcap 12 comprises a first retentate outlet 14 to withdraw the retentate fluids from the first bundle of hollow fiber membranes 3 from the first non-permeate outlet region 13. A third endcap 15 is attached to the third open end of the shell 2, wherein a second permeate outlet region 16 is established between the third endcap 15 and the outer face of the third tubesheet 7. The third endcap 15 comprises a second permeate outlet 17 to withdraw from the second permeate outlet region 16 the fluids permeating from the boreside of the second set of hollow fiber membranes 4. A fourth sealing endcap 18 is attached to the fourth open end of the shell 2, wherein a third permeate outlet region 19 is established between fourth endcap 18 and the outer face of the fourth tubesheet 8. The fourth endcap 18 comprises a third permeate outlet 20 for removing from the third permeate outlet region 19, fluid which permeates from the boreside of the second set of hollow fiber membranes 4. A first permeate outlet region 21 is formed between the shell 2 and the outside of the first bundle of hollow fiber membranes 3 by first and second sealing mechanism, respectively, which seal the first and second tubesheets against the shell, respectively. Similarly, a second feed inlet region 22 is formed between the shell 2 and the outside of the first bundle 3 for introducing fluid from the mixture which permeates from the first bundle of hollow fiber membranes 3 into the shellside of the second bundle of hollow fiber membranes 4. A fourth permeate outlet 23 is located in the shell 2 near the first tubesheet 5, for withdrawing from the first permeate outlet region 21 the permeate fluid from the shellside of the first bundle of hollow fiber membranes 3. The shell side of the first bundle of hollow fiber membranes 3 further comprises baffles 24 wrapped around the bundle.

In an alternative embodiment, the first endcap 9 extends over the third endcap 15 to form a single segmented head assembly around the first retentate outlet 17.

FIG. 2 illustrates another embodiment of the hollow fiber membrane device 101 of the invention wherein the entire device is housed within a shell 102. The device comprises a first set of hollow fiber membranes 103 adapted for boreside feed; and a second set of hollow fiber membranes 104 adapted for shellside feed, wherein the first set of hollow fiber membranes 103 and second set of hollow fiber membranes 104 are intermingled with each other. The first tubesheet 105 and the second tubesheet 106 are arranged at the first and second end, respectively, of the first set of hollow fiber membranes 103. The third tubesheet 107 and the fourth tubesheet 108 are arranged at the first and second end, respectively, of the second set of hollow fiber membranes 104. The high pressure feed is introduced in to the first set of hollow fiber membranes 103 through a feed inlet 111, while the non-permeate fluid is removed through the first retentate outlet 114. The permeate from the boreside of second set of hollow fiber membranes 104 is withdrawn from the second permeate outlet 117 and the third permeate outlet 120. A fourth permeate outlet 123 is located in the shell 102 for withdrawing from the permeate fluid from the shellside of the first 103 and second bundle 104 of hollow fiber membranes. The shellside of the first 103 and second set 104 of hollow fiber membranes further comprise baffles 124.

Figure 3:
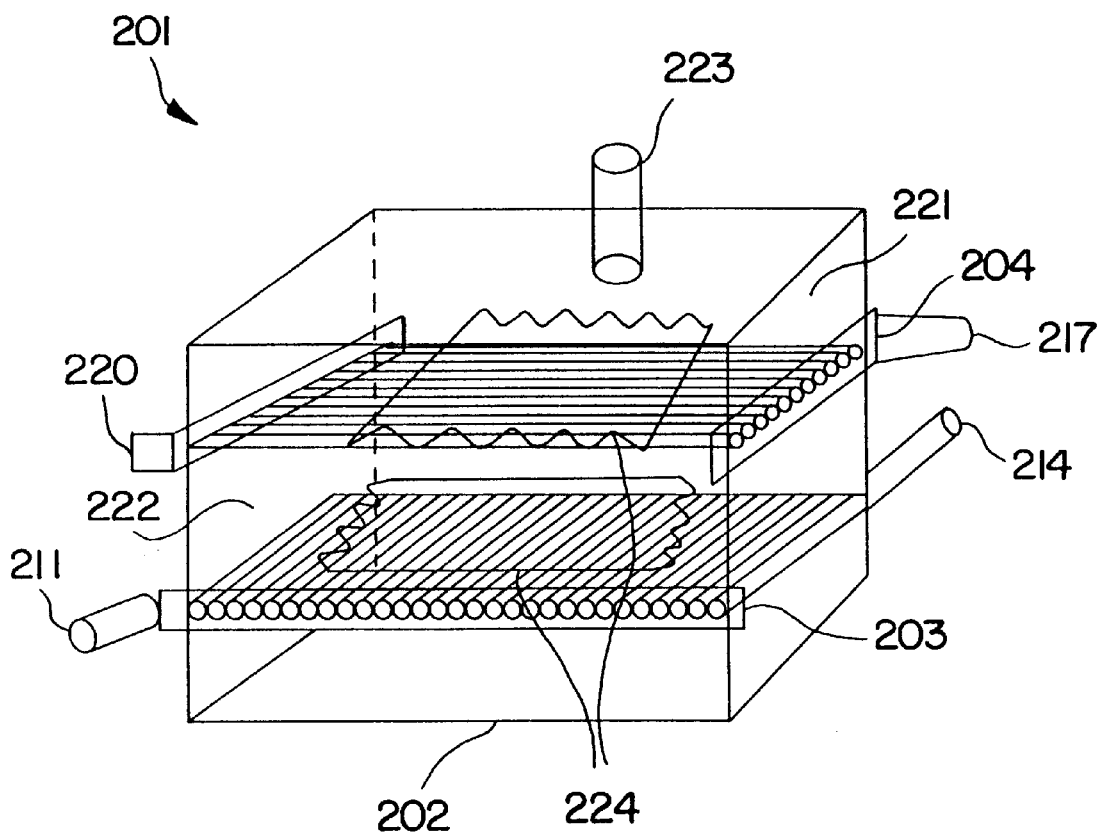
FIG. 3 illustrates a sectional view of the membrane separation device according to an additional embodiment of the invention.

FIG. 3 illustrates another embodiment of the hollow fiber membrane device 201 of the invention wherein the entire device is housed within a shell 202. The device comprises a first set of hollow fiber membranes arranged in a first sheet 203, wherein the first sheet is adapted for boreside feed. The device further comprises a second set of hollow fiber membranes arranged in as a second sheet 204, wherein the second sheet is adapted for shellside feed. The high pressure feed is introduced in to the first sheet through the feed inlet 211, while the non-permeate fluid is removed through the first retentate outlet 214. The fluids permeating from the boreside of the second set of hollow fiber membranes 204 is withdrawn from second permeate outlet 217 and/or the third permeate outlet 220. The second feed inlet region 222 is formed between the shell 202 and one side of the first sheet 203 for introducing the intermediate-pressure permeate from the first sheet of hollow fiber membranes 203 into the shellside of the second sheet of hollow fiber membranes 204. A fourth permeate outlet 223 is located in the shell 202 for withdrawing from the low-pressure permeate outlet region 221 the permeate fluid from the shellside of the second sheet 204 of hollow fiber membranes 204. The shellside of the first 203 and second sheet 204 of hollow fiber membranes further comprise baffles 224.

Operation of the membranes device 1 can be illustrated by reference to FIG. 1. A fluid mixture to be separated, i.e. the high-pressure feed, is introduced via the feed inlet 11 into the feed inlet region 10 under pressure. The fluid mixture flows through the bores of the first set of hollow fiber membranes 3, and a portion of the feed fluid mixture permeates across the first set of hollow fiber membranes 3 into the shellside region of the membrane device 1. The retentate fluid exits the first set of hollow fiber membranes 3 into the first non-permeate outlet region 13 and is removed form the device through the non-permeate outlet 14. The intermediate-pressure permeate from the first set of hollow fiber membranes introduced into the shellside of the set of hollow fiber membranes through the second feed inlet region 22. The permeate is removed from the boreside of the second set of the hollow fiber membranes through the second and third permeate outlet; and from the shellside of the device through the fourth permeate outlet 23.

Thus, a membrane device comprising an internally staged permeator containing a three dimensional array of hollow fiber membranes grouped into multiple sets in intimate contact with each other is disclosed. Although preferred embodiments of the invention device have been described in some detail, it is understood that obvious variations can be made without departing from the spirit and scope of the invention as defined by the appended claims.

We claim:

1. A hollow fiber membrane fluid separation device comprising:

(a) a first set of plurality of elongate hollow fiber membranes adapted for separation of one or more fluids from a fluid mixture, wherein said membranes are arranged in a first set of hollow fiber membranes having a first end and a second end, and further wherein said first set of hollow fiber membranes is adapted for boreside feed;

(b) a first tubesheet having an inner face and an outer face and arranged at the first end of the first set of hollow fiber membranes, wherein said first set of hollow fiber membranes extend through said first tubesheet and are open at the outer face thereof;

(c) a second tubesheet having an inner face and an outer face and arranged at the second end of the first set of hollow fiber membranes, wherein said first set of hollow fiber membranes extend through said second tubesheet and are open at the outer face thereof;

(d) a second set of a plurality of elongate hollow fiber membranes adapted for separation of one or more fluids from a fluid mixture, wherein said membranes are arranged in a second set of hollow fiber membranes having a first end and a second end, and further wherein said second set of hollow fiber membranes is adapted for shellside feed;

(e) a third tubesheet having an inner face and an outer face and arranged at the first end of the second set of hollow fiber membranes, wherein said second set of hollow fiber membranes extend through said third tubesheet and are open at the outer face thereof;

(f) a fourth tubesheet having an inner face and an outer face and arranged at the second end of the second set of hollow fiber membranes, wherein said second set of hollow fiber membranes extend through said fourth tubesheet and are open at the outer face thereof;

(g) a shell having first, second, third and fourth open ends, wherein the first set of fiber membranes, the first and second tubesheets, and the second set of hollow fiber membranes, the third and fourth tubesheets are encased within said shell, and the first set of hollow fiber membranes and the second set of hollow fiber membranes are arranged in spaced-apart relation to each other within the shell;

(h) a first sealing endcap which is attached to the first open end of the shell, wherein a first feed inlet region is established between said first endcap and the outer face of the first tubesheet;

(i) a first feed inlet for introducing into the first feed inlet region a fluid mixture to be separated into the bores of the first set of hollow fiber membranes;

(j) a second sealing endcap which is attached to the second open end of the shell, wherein a first non-permeate outlet region is established between said second endcap and the outer face of the second tubesheet;

(k) a first retentate outlet for removing from the non-permeate outlet region fluid from the mixture which does not permeate from the first set of hollow fiber membranes;

(l) a third sealing endcap which is attached to the third open end of the shell, wherein a second permeate outlet region is established between said third endcap and the outer face of the third tubesheet;

(m) a second permeate outlet for removing from the second permeate outlet region fluid from the mixture which permeates from the boreside of the second set of hollow membranes;

(n) a fourth sealing endcap which is attached to the fourth open end of the shell, wherein a third permeate outlet region established between said fourth endcap and the outer face of the fourth tubesheet;

(o) a third permeate outlet for removing from the third permeate outlet region fluid from the mixture which permeates from the boreside of the second set of hollow fiber membranes;

(p) first and second sealing mechanism which respectively seal the first and second tubesheets against the shell, thereby defining first permeate outlet region between said shell and the outside of said first set of hollow fiber membranes, wherein said region comprises a second feed inlet region for introducing fluid from the mixture which permeates from the first set of hollow fiber membranes into the shellside of said second set of hollow fiber membranes; and (q) a fourth permeate outlet for removing from the first permeate outlet region fluid from the mixture which permeates from the shellside of the set of hollow fiber membranes.

2. The device of claim 1 further comprising baffles, wherein said baffles are within or wrapped around one or both of said first and second sets of hollow fiber membranes.

3. The device of claim 2 further comprising a first set of a plurality of elongate permeate flow channels arranged in spaced-apart relation to each other within the first set of hollow fiber membranes and extending from the first end to the second end of the first set of hollow fiber membranes, wherein said first set of permeate flow channels are embedded in said first and second tubesheets.

4. The device of claim 3, wherein said first set of permeate flow channels are arranged uniformly within said first set of hollow fiber membranes such that efficient flow performance can be maintained during fluid separations.

5. The device of claim 2 further comprising a second set of a plurality of elongate permeate flow channels arranged in spaced-apart relation to each other within the second set of hollow fiber membranes and extending from the first end to the second end of the second set of hollow fiber membranes, wherein said second set of permeate flow channels are embedded in said third and fourth tubesheets.

6. The device of claim 5, wherein said second set of permeate flow channels are arranged uniformly within said second set of hollow fiber membranes such that efficient flow performance can be maintained during fluid separations.

7. The device of claim 2 wherein the first retentate outlet further comprises a regulator.

8. The device of claim 2 wherein the second permeate outlet further comprises a regulator.

9. The device of claim 2 wherein the third permeate outlet further comprises a regulator.

10. The device of claim 2 further comprising a sweep inlet at the opposite end of the module from the first feed inlet for introduction of a sweep fluid.

11. The device of claim 2 further comprising a sweep inlet at the same end of the module as the first feed inlet for introduction of a sweep fluid.

12. The device of claim 1, wherein each of said first and second sets of hollow fiber membranes comprise said membranes arranged in a bundle, as sheets or as cartridges.

13. The device of claim 12 further comprising baffles.

14. The device of claim 1, wherein the first and second sets of hollow fiber membranes are arranged at an angle of about 0 degrees to about 180 degrees from each other.

15. The device of claim 14, wherein the first and second sets of hollow fiber membranes are arranged at an angle of about 90 degrees from each other.

16. The device of claim 1, wherein the first and second sets of hollow fiber membranes are spaced about 1 mm to about 1 m from each other.

17. The device of claim 1, wherein the membrane packing density in each of said sets of hollow fiber membranes is between about 30 percent to about 70 percent.

18. The device of claim 1, wherein the ratio of the hollow fiber membrane count in the first set of hollow fiber membranes to the hollow fiber membrane count in the second set of hollow fiber membranes is about 5:1 to about 1:5.

19. The device of claim 13, wherein the first set of hollow fiber membranes is encased within the second set of hollow fiber membranes.

20. The device of claim 13, wherein the second set of hollow fiber membranes is encased within the first set of hollow fiber membranes.

21. The device of claim 13, wherein each said first and second sets of hollow fiber membranes comprises a series of concentric layers of hollow fiber membranes arranged in a first and a second bundle, respectively.

22. The device of claim 13 further comprising (a) a first set of a plurality of elongate permeate flow channels arranged in spaced-apart relation to each other within the first set of hollow fiber membranes and extending from the first end to the second end of the first set of hollow fiber membranes, wherein said first set of permeate flow channels are embedded in said first and second tubesheet; and (b) a second set of a plurality of elongate permeate flow channels arranged in spaced-apart relation to each other within the second set of hollow fiber membranes and extending from the first end to the second end of the second set of hollow fiber membranes, wherein said second set of permeate flow channels are embedded in said third and fourth tubesheets.

23. The device of claim 22, wherein said first and second set of permeate flow channels are arranged at the interfaces between adjacent concentric membrane layers within each said first and second bundle respectively.

24. The device of claim 1, wherein the fluid mixture to be separated comprises a mixture of two or more gases.

25. The device of claim 24, wherein the gas mixture comprises a gas selected from the group consisting of hydrogen, oxygen, helium, nitrogen, methane, carbon monoxide, and carbon dioxide.

* * * * *